United States Patent Office 3,561,988
Patented Feb. 9, 1971

3,561,988
METHOD OF TREATING LIME
Norman L. Kelly, Paris, Ontario, Canada, assignor to Domtar Limited, Montreal, Quebec, Canada, a company of Canada
No Drawing. Filed May 16, 1968, Ser. No. 729,551
Claims priority, application Canada, June 8, 1967, 992,566
Int. Cl. C04b 7/34
U.S. Cl. 106—118                             6 Claims

ABSTRACT OF THE DISCLOSURE

A method of improving the rate of plasticity development of a finishing lime by soaking the hydrated lime in the presence of an admixture of a water-soluble compound of barium or strontium.

---

The present invention relates to the treatment of hydrated lime and is especially concerned with the treatment of hydrated lime for use as finishing lime.

For a hydrated lime to be of a finishing lime grade it must form a putty which is suitable for spreading to a uniform thin finish as the surface or finishing coat on the plaster base of a wall. According to the requirements set forth in the ASTM or other recognized specifications the lime must have the ability to form a putty which develops plasticity, measured by an Emley plasticimeter, of not less than 200 after soaking for a period not exceeding 24 hours. Plasticity, also referred to as water-retention, is a measure of the property the putty has for spreading easily to a uniform thin finish on an absorbent surface and it depends on the capacity the putty has for retaining its water against the suction of an absorbent surface to which it is applied.

Finishing limes are generally derived from dolomitic quicklime which contains about 40% MgO and 55% CaO, although high calcium limes in which the MgO content is below about 2%, or magnesian limes in which the MgO content lies between that of the high calcium and dolomitic limes, have also been used. The dolomitic hydrates can be divided into two types, namely: Type-S special finishing hydrate, and Type-N normal finishing hydrate. Type-S differs from Type-N, principally by its ability to develop high early plasticity without requiring prolonged periods of soaking and by its low content of unhydrated oxide of up to 8%. Type-N hydrates develop plasticity rather slowly; some may require soaking periods well in excess of 16 hours and others may not develop a putty of the desired plasticity even after very prolonged periods of soaking. Such Type-N hydrates have a tendency to thicken excessively or form lumps, and hence require mixing or hoeing prior to the soaking period or screening of the formed putty to produce a uniform material which can be readily mixed with gauging plaster for subsequent spreading as a finishing coat. For practical reasons, e.g. relating to work schedules, inventories etc., generally the miximum soaking time is about a day, i.e. 16–24 hours, and hydrates which fail to develop adequate plasticity in this soaking period have poor workability and are difficult to spread to form a uniform thin finish on a plaster base.

It is, therefore, an object of the present invention to provide a process for improving the plasticity of finishing hydrated lime, particularly Type-N dolomitic hydrates.

It is another object of the present invention to provide a process for improving the rate of plasticity development of finishing hydrated lime, particularly Type-N dolomitic hydrates.

It has now been discovered that the aforementioned difficulties are avoided, and improved plasticity is imparted to finishing hydrated lime, particularly Type-N dolomitic hydrates, by the addition of a water-soluble salt or base of certain alkaline earth metals, such as barium or strontium. This discovery permits the use of such Type-N dolomitic hydrates which otherwise could only be used with difficulty because of their aforementioned failure to develop the required plasticity within a reasonable soaking period (and for their tendency to form lumps). By adding the alkaline earth metal compound a putty is obtained which has substantially improved workability, thereby making it easier for the workman to spread to a uniform thin finish.

Various compounds of the said alkaline earth metals function satisfactorily to improve plasticity and the chloride, iodide, nitrate, hydroxide and acetate of said metals are especially useful in the present invention. While these compounds of barium and strontium appreciably improve plasticity, the compounds of other alkaline earth metals such as calcium and magnesium do not appear to have the same effect. Compounds of radium may also be effective, but their use would, of course, be commercially prohibitive. In general, barium compounds are the most effective, and barium chloride is the preferred additive because of its solubility, low cost and marked effect on plasticity.

The alkaline earth metal compound can be added to the hydrated lime in various proportions according to the degree of plasticity one desires to achieve. Within limits, the plasticity will increase as the amount of additive increases. Different compounds affect plasticity in different degrees, and even to achieve the same degree of improvement it may be necessary to use the different additives in different proportions. Amounts as small as 1 lb./ton have been found to have a considerable effect on some Type-N dolomitic hydrates, but generally these additives are employed in amounts of about 2 to 40 lb./ton and preferably from about 4 to 20 lbs./ton. It will be understood that the present invention is not limited to the said amounts, as higher amounts up to and in excess of 100 lbs./ton may also be used, except that such higher amounts may become prohibitive because of the cost involved and may also have undesirable effects on set when the putty is mixed with a gauging plaster. It should be noted that the alkaline earth metal compound of this invention should be added to the already hydrated lime, i.e. either mixed with the hydrate or dissolved in the water used for soaking the hydrate. The desired improvement in plasticity is not achieved or achieved in less degree if the compound is added to the lime prior to hydration or to the hydrating water. The treated lime, according to this invention, can be made into a putty in the usual manner in a soaking box or other suitable equipment, the lime being dumped into the water already placed in the box in approximately equal parts by weight of lime to water.

It is, of course, not desired to limit this invention to any particular theory. It is believed, however, that the basic cause for the failure of some Type-N dolomitic hydrates to attain adequate plasticity on soaking may be attributed to the presence of sulphate ions in the putty (sulphur may be picked up by the lime from the fuel used in calcination). Type-N dolomitic limes still contain a substantial amount of unhydrated oxides which will hydrate only in the course of soaking the lime to form the putty. Hydration of this previously unhydrated magnesia during soaking causes splitting off of fine particles and the forming of a gel of magnesium hydroxide. The presence of the sulphate ion apparently causes these fine particles to agglomerate into larger particles and since plasticity is related to the fineness of the particles the plasticity of the lime is affected. By adding a soluble compound to precipitate out the sulphate ion the development of fine particles and consequently of plasticity goes on unimpeded.

The employment of an additive as taught by the present invention provides a number of advantages in the preparation of the lime and the use of the putty produced therefrom. The treatment described permits the use of a calcining system which otherwise might be objectionable because of the amount of sulphate introduced into the lime. Thus, for example, coal or unrefined fuel oil or other fuel may be employed instead of such low sulphur products as refined oil or gas, which may not always be available or economically justified. Similarly, a kiln, such as the vertical or shaft kiln which permits intimate contact between combustion gases and the lime, hence producing a higher sulphate level in the lime and which might not be considered for the production of finishing lime for this reason, can with the help of the present invention, be satisfactorily used. Type-N dolomitic hydrates can develop plasticity much more rapidly than otherwise possible, and a putty can be obtained which is much easier to spread to a uniform thin finish. A still further advantage is that the treated hydrates can develop plasticity and maintain consistency even when soaked at temperatures below room temperature, whereas normally, lowering the temperature of the soaking water will substantially reduce plasticity so that near freezing the plasticity will be quite low.

The following examples will show the benefits derived by employing barium chloride or other additive in Type-N dolomitic hydrates. It is to be understood that these examples serve to illustrate the present invention without, however, limiting the same thereto. In preparing the putty, the proportioning of the hydrates and water was done so that approximately equal parts by weight of hydrates and water were used; the hydrates were added to water in a soaking box and the slurry was stirred. The barium chloride or other additive was added to the hydrate prior to soaking.

The following example shows the effect that an additive such as $BaCl_2$ has on the development of plasticity in various Type-N dolomitic hydrates of different origin. The plasticity was recorded after 16 hours of soaking.

EXAMPLE I

| Lime | $BaCl_2$ lbs./ton | Plasticity |
|---|---|---|
| Southern Ontario (Star) | 0 | 237 |
|  | 10 | 390 |
| Ohio (1) (Blubag) | 0 | 240 |
|  | 20 | 330 |
| Ohio (2) (Tiger White Rock) | 0 | 310 |
|  | 20 | 470 |

Example II A and B show the effect an increase in the amount of $BaCl_2$ has on the plasticity of two samples, sample (A) and sample (B), of a Type-N dolomitic hydrate (Southern Ontario lime known as "Whitecoat") having a relatively high sulphate content. The plasticity was recorded after 16 hours of soaking.

EXAMPLE II

| | Plasticity | |
|---|---|---|
| $BaCl_2$ lbs./ton: | Sample A | Sample B |
| 0 | 265 | 250 |
| 1 | 292 | 250 |
| 2 | 320 | 258 |
| 4 | 365 | 250 |
| 8 | 555 | 330 |
| 12 | | 415 |
| 16 | | 435 |
| 20 | | 465 |
| 40 | | 510 |
| 70 | 555 | |
| 100 | 585 | |

In this particular hydrate a significant increase in plasticity occurs after an amount of $BaCl_2$ between 4 and 8 lbs./ton has been added.

Example III compares the rate at which plasticity develops in an untreated hydrate with a relatively high sulphate content and in the same hydrate treated with 12 lbs. $BaCl_2$ per ton.

EXAMPLE III

| Soaking time (hr.): | Southern Ontario lime (Whitecoat) no additive | Same lime with $BaCl_2$ 12 lbs./ton |
|---|---|---|
| 0 | 115 | 115 |
| 1 | 145 | 160 |
| 2 | 160 | 200 |
| 4 | 190 | 292 |
| 7 | 215 | 322 |
| 16 | 250 | 415 |

As shown by Example III the presence of $BaCl_2$ has enabled the treated hydrate to develop in 4 hours, the plasticity that the untreated could only develop in 16 hours.

Example IV shows the effect of different soaking temperatures on the plasticity of an untreated hydrate with a relatively high sulphate content and the same hydrate containing 10 lbs./ton of barium chloride. The plasticity was recorded after 16 hours of soaking.

EXAMPLE IV

| | Soaking temperature, °F. | Plasticity |
|---|---|---|
| Southern Ontario lime (Whitecoat) no additive | 70 | 272 |
| | 40 | 198 |
| Same lime with $BaCl_2$ 10 lbs./ton | 40 | 325 |

The employment of $BaCl_2$ enables the hydrate so treated to develop good plasticity even under cold soaking conditions.

The following example indicates the results obtained when other barium compounds, such as barium iodide, barium hydroxide and barium nitrate, and strontium compounds are added to a hydrate with relatively high sulphate content. The amounts used are stoichiometric equivalents of 12 lbs./ton of barium chloride dihydrate.

EXAMPLE V

| Compound | lbs. per ton | Plasticity after 16 hours) |
|---|---|---|
| None | 0 | 250 |
| Barium chloride ($2H_2O$) | 12 | 415 |
| Barium iodide ($2H_2O$) | 21 | 380 |
| Barium hydroxide ($8H_2O$) | 15½ | 375 |
| Barium nitrate | 13 | 490 |
| Strontium chloride ($6H_2O$) | 13 | 280 |
| Strontium nitrate | 10½ | 310 |
| Strontium acetate | 10 | 285 |

As seen in the above table the addition of other barium compounds has an effect similar to the chloride but to a greater or lesser degree. The strontium compounds also impart improvements in plasticity, but are less effective than the barium compounds.

It is evident from the foregoing description and specific examples the employment of the additive of this invention results in a significant improvement in the development of plasticity in Type-N dolomitic hydrates, and hence the workability thereof,. A substantially similar effect can be obtained by using the additive of this invention with magnesium lime hydrates and, to a considerably less degree however, with high calcium limes and Type-S dolomitic limes.

I claim:

1. In the process of making a finished lime putty from normal-type hydrated finishing lime in which said hydrated finishing lime is mixed with water and soaked in said water until a lime putty of desired plasticity is obtained, the improvement comprising soaking said hydrated finishing lime in said water in the presence of a water-soluble barium compound in an amount between 2 and 40 lbs. per ton of lime, whereby the plasticity development of the lime putty is substantially accelerated.

2. The method of claim 1 wherein said water-soluble barium compound is one of the group consisting of a chloride, iodide, nitrate, hydroxide and acetate of barium.

3. The method of claim 2 wherein said barium compound is present in an amount between 4 and 20 lbs. per ton of lime.

4. The method of claim 2 wherein said barium compound is barium chloride.

5. A composition consisting essentially of a mixture of a hydrated Type-N dolomitic finishing lime and water-soluble compound of the group consisting of a chloride, iodide, nitrate, hydroxide and acetate of barium, said water-soluble compound being present in an amount between 2 and 40 lbs. per ton of lime.

6. The composition of claim 5 wherein the compound is barium chloride.

References Cited
UNITED STATES PATENTS 2,048,967   7/1936   Rex _____ 106—118

JAMES E. POER, Primary Examiner

U.S. Cl. X.R.

106—119